United States Patent
Timlin, III

(10) Patent No.: US 11,028,735 B2
(45) Date of Patent: Jun. 8, 2021

(54) THERMAL POWER CYCLE

(76) Inventor: Michael Joseph Timlin, III, Littleton, CO (US)

( * ) Notice: Subject to any disclaimer, the term of this patent is extended or adjusted under 35 U.S.C. 154(b) by 690 days.

(21) Appl. No.: 13/816,490

(22) PCT Filed: Aug. 26, 2011
(Under 37 CFR 1.47)

(86) PCT No.: PCT/IB2011/003348
§ 371 (c)(1),
(2), (4) Date: Feb. 11, 2013

(87) PCT Pub. No.: WO2012/069932
PCT Pub. Date: May 31, 2012

(65) Prior Publication Data
US 2013/0133328 A1 May 30, 2013

Related U.S. Application Data

(60) Provisional application No. 61/377,094, filed on Aug. 26, 2010.

(51) Int. Cl.
*F01K 25/08* (2006.01)
*C09K 5/04* (2006.01)
*F01K 25/06* (2006.01)

(52) U.S. Cl.
CPC .............. *F01K 25/08* (2013.01); *C09K 5/041* (2013.01); *F01K 25/06* (2013.01); *C09K 2205/102* (2013.01)

(58) Field of Classification Search
CPC .... C09K 2205/102; C09K 5/041; F01K 25/08
(Continued)

(56) References Cited

U.S. PATENT DOCUMENTS

| 1 | A | | 7/1836 | Ruggles |
| 296,197 | A | * | 4/1884 | Lowrey ................... F01K 25/08 60/671 |

(Continued)

OTHER PUBLICATIONS

Honeywell, Working Fluid Developments for HT Heat Pumps and ORC Systems, Chillventa 2010.*
(Continued)

*Primary Examiner* — Jesse S Bogue
(74) *Attorney, Agent, or Firm* — Holland & Hart, LLP

(57) ABSTRACT

One embodiment of an improved thermal power cycle comprising a wet binary motive fluid, pump (21), evaporator (22), expander (23), and condenser (24). Using a binary motive fluid, it can operate efficiently over a lower range of heat source temperatures than the steam Rankine cycle. Using a wet binary motive fluid, it eliminates the need for superheating the fluid in evaporator (22), allows for complete expansion of the fluid in expander (23), and reduces back-pressure by the fluid on expander (23), thereby providing higher efficiency than the ORC (organic Rankine cycle), Eliminating the regenerator that is used by ORC systems results in a simpler, less costly system. Using direct-contact heat exchange in condenser (24) rather than the indirect-contact heat exchange used by ORC systems results in more efficient condensation of the fluid. Using a pump (21) rather than the power-hungry compressor used by ORC systems further reduces power losses and expenses. Accordingly, the improved cycle provides higher overall system efficiency at lower overall system cost. Other embodiments are described and shown.

19 Claims, 11 Drawing Sheets

Figure 1:
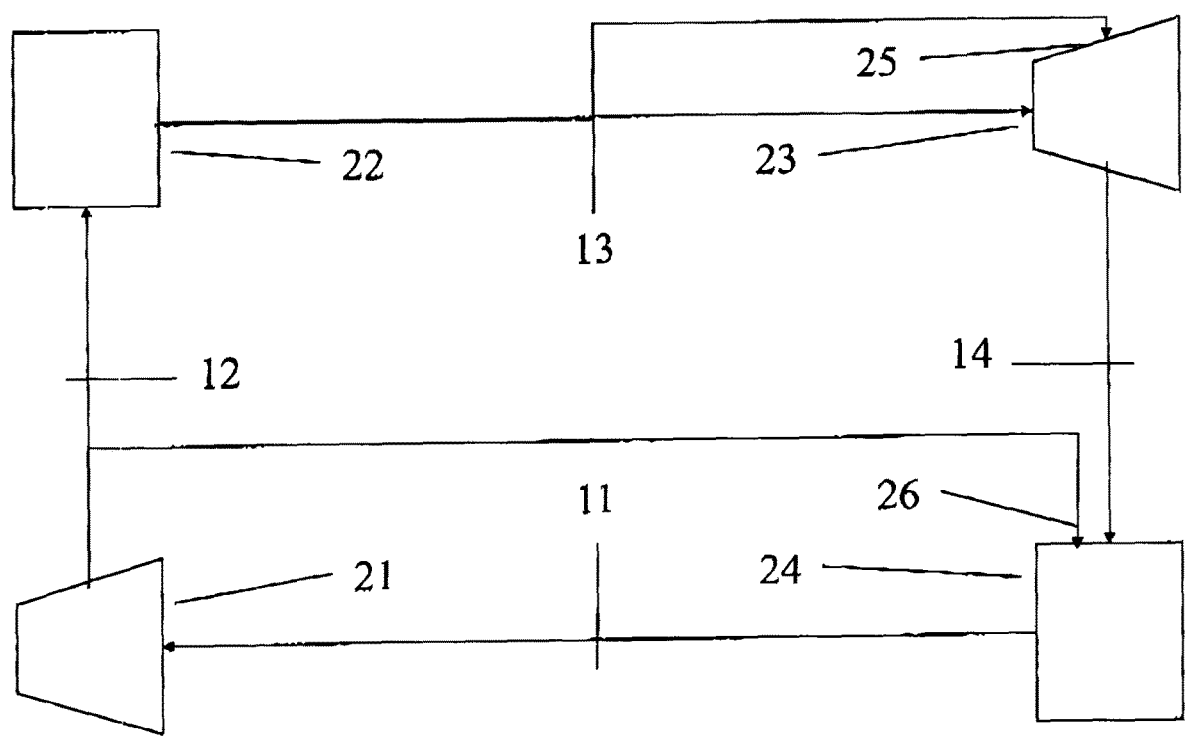

(58) Field of Classification Search
USPC .................................................. 60/643–681
See application file for complete search history.

(56) References Cited

U.S. PATENT DOCUMENTS

| | | | |
|---|---|---|---|
| 1,154,880 A | 9/1915 | Patten | |
| 2,301,404 A | 11/1942 | Holmes | |
| 2,471,476 A | 5/1949 | Benning et al. | |
| 3,040,528 A | 6/1962 | Tabor et al. | |
| 3,516,248 A | 6/1970 | Mcewen | |
| 3,722,211 A | 3/1973 | Conner et al. | |
| 3,802,186 A * | 4/1974 | Mahler | F01K 25/08 252/400.53 |
| 3,841,099 A * | 10/1974 | Somekh | F01K 25/10 252/67 |
| 3,982,379 A * | 9/1976 | Gilli | F01K 1/04 122/35 |
| 4,008,573 A | 2/1977 | Petrillo | |
| 4,164,848 A * | 8/1979 | Gilli | F01K 3/14 122/35 |
| 4,232,525 A | 11/1980 | Enjo et al. | |
| 4,346,561 A | 8/1982 | Kalina | |
| 4,358,930 A * | 11/1982 | Pope | F01K 25/06 60/641.2 |
| 4,448,025 A * | 5/1984 | Oda | F01K 25/06 252/67 |
| 4,553,397 A * | 11/1985 | Wilensky | 60/649 |
| 4,557,112 A | 12/1985 | Smith | |
| 4,760,705 A * | 8/1988 | Yogev | C09K 5/04 60/641.8 |
| 4,876,855 A * | 10/1989 | Yogev | F01K 25/06 60/651 |
| 5,027,602 A * | 7/1991 | Glen et al. | 60/651 |
| 5,680,764 A * | 10/1997 | Viteri | F01K 21/047 60/39.6 |
| 6,422,017 B1 | 7/2002 | Bassily | |
| 6,866,092 B1 | 3/2005 | Molivadas | |
| 7,019,412 B2 * | 3/2006 | Ruggieri | F01K 17/02 290/2 |
| 7,454,912 B2 * | 11/2008 | Yamanaka | F02G 5/00 60/618 |
| 7,469,540 B1 * | 12/2008 | Knapton | F01K 25/106 60/618 |
| 7,594,399 B2 * | 9/2009 | Lehar | F01K 25/06 60/649 |
| 7,827,791 B2 * | 11/2010 | Pierson | F01K 3/14 60/653 |
| 8,276,379 B2 * | 10/2012 | Logan | F03G 6/065 60/641.14 |
| 8,713,939 B2 * | 5/2014 | Tsuchino | F01K 13/02 60/615 |
| 8,820,079 B2 * | 9/2014 | Zyhowski | C07C 21/18 252/68 |
| 2003/0000213 A1 * | 1/2003 | Christensen | F01K 25/08 60/670 |
| 2004/0103661 A1 * | 6/2004 | Ohta et al. | 60/670 |
| 2005/0188697 A1 * | 9/2005 | Zyhowski | C09K 5/045 60/671 |
| 2006/0010868 A1 * | 1/2006 | Smith | F01K 25/06 60/645 |
| 2007/0101989 A1 * | 5/2007 | Strathman | F01K 13/00 126/636 |
| 2007/0245733 A1 * | 10/2007 | Pierson | F01K 25/08 60/651 |
| 2009/0126364 A1 * | 5/2009 | Mills | F01K 9/003 60/641.8 |
| 2009/0277400 A1 * | 11/2009 | Conry | F01K 23/065 123/2 |
| 2009/0301090 A1 * | 12/2009 | Fukushima | C09K 5/045 60/670 |
| 2010/0084120 A1 * | 4/2010 | Yin | F22B 27/00 165/146 |
| 2010/0126172 A1 * | 5/2010 | Sami | F01K 25/06 60/651 |
| 2010/0154419 A1 * | 6/2010 | Kontomaris | F01K 23/064 60/645 |
| 2011/0048014 A1 | 3/2011 | Chen | |
| 2011/0167823 A1 * | 7/2011 | Berger | F01K 23/065 60/645 |
| 2011/0167825 A1 * | 7/2011 | Mauran et al. | 60/670 |
| 2011/0252796 A1 * | 10/2011 | Burkhart | F01K 27/00 60/641.2 |
| 2011/0277476 A1 * | 11/2011 | Minovitch | F01K 15/02 60/645 |
| 2012/0006024 A1 * | 1/2012 | Hays et al. | 60/651 |
| 2013/0193369 A1 * | 8/2013 | Low | C08J 9/149 252/68 |
| 2014/0007575 A1 * | 1/2014 | Ernst | F01K 23/065 60/618 |

OTHER PUBLICATIONS

Fluid Selection for a low temperature solar organic Rankine Cycle; Bertrand Fankam Tchanche, Dec. 31, 2008, Elsevier.com.*
Honeywell, Working Fluid Developments for HT Heat Pumps and ORC Systems, Chillventa Jul. 15, 2010.*
WO2010009839A2, Berger, Jan. 28, 2010.*
Comparative assessment of regrigerants, Sunita, Dec. 2011.*
Fluid Selection for a low temperature solar organic Rankine Cycle; Bertrand Fankam Tchanche, Dec. 31, 2008 (Year: 2008).*
Huijuan Chen, Renewable and Sustainable Energy Reviews, Jul. 30, 2010, Elsvier.com (Year: 2010).*
Madhawa Hettiarachchi, "Optimum design criteria for an Organic Rankine cycle using low-temperature geothermal heat sources", Published 2007, pp. 1698-1706.*
International Search Report and Written Opinion from corresponding PCT International Application No. PCT/US2011/003348, dated Aug. 24, 2012 (8 pp.).
Timlin, M. J., New Mexico Geothermal Working Group, Socorro, NM, "Geothermal Reservoir Engineering", May 20, 2009 (35 pp.).

* cited by examiner

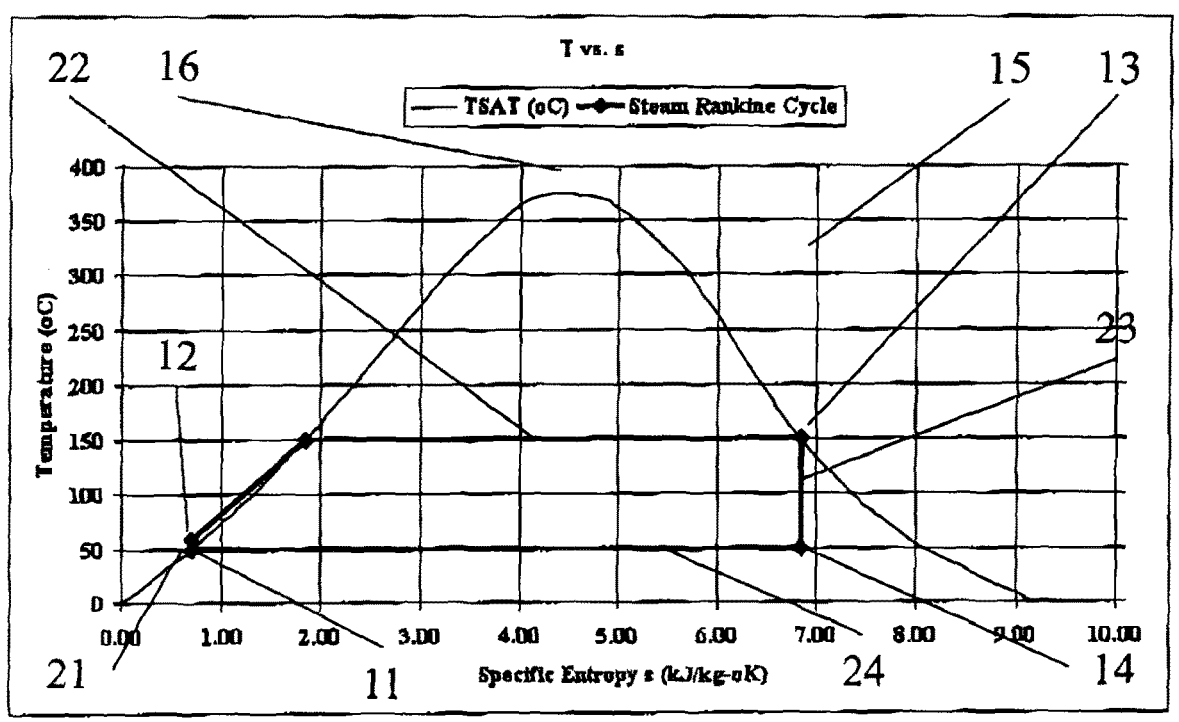
FIG. 6 – PRIOR ART

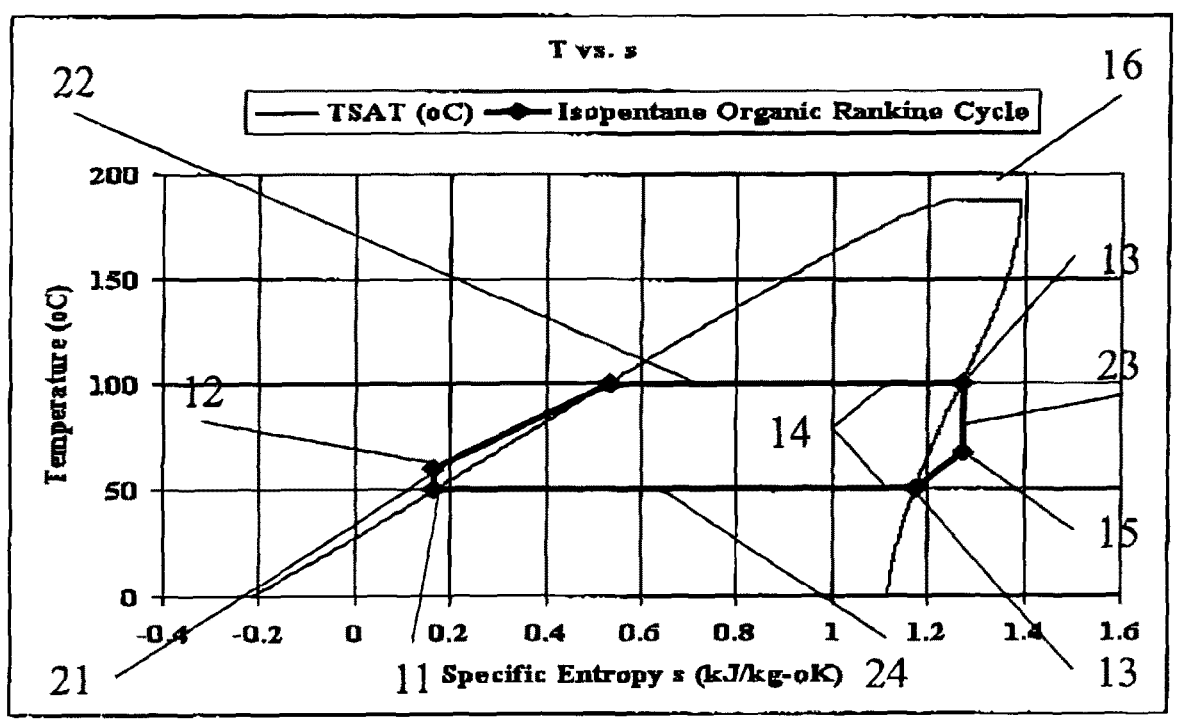
FIG. 7 – PRIOR ART

THERMAL POWER CYCLE

CROSS-REFERENCE TO RELATED APPLICATIONS

This application claims the benefit of provisional patent application Ser. No. U.S. 61/377,094, filed 2010 Aug. 26 by the present inventor, which is incorporated by reference.

BACKGROUND

Thermal power production is largely a matter of heat source—heat sink temperature difference and heat transfer capacity, that Ls, providing the correct amount of heat transfer capacity at an affordable cost for the source—sink difference that is available.

For similar types of thermal power systems, the larger the source—sink difference that the resource provides, the higher the maximum efficiency at which the system can operate. This maximum efficiency limit is often described by the Carnot cycle (Nicolas Carnot, 1824).

While the Carnot cycle is simple to understand, it is difficult to implement. Therefore, most thermal power systems have come to rely on the Rankine cycle (William Rankine, prior to 1872), which is slightly less efficient in theory but much more achievable in practice than the Carnot cycle. In Fundamentals of Classical Thermodynamics (1976), Van Wylen and Sonntag provide detailed analyses of both Carnot and Rankine cycles. The Rankine cycle is used in most thermal power systems today. As originally conceived by Rankine for steam engines and most frequently implemented today in steam turbines, the Rankine cycle uses water as its motive fluid.

For the purposes of this application, a binary motive fluid is defined as a motive fluid comprising a substance other than water. This definition includes pure substances other than water, mixtures of water and pure substances other than water, and azeotropes (constant-boiling mixtures) of water and pure substances other than water. Applying this definition, methanol is a binary motive fluid, methanol and water form a binary motive fluid as a mixture (but not an azeotrope), and ethanol and water form a binary motive fluid as an azeotrope of approximately 95% ethanol and 5% water at standard atmospheric pressure.

Both Carnot and Rankine specified isentropic expansion as being the process that converted thermal energy into mechanical power. For the purposes of this application, a wet fluid is a fluid that expands isentropically from saturated vapor into a two-phase mixture of vapor and liquid. A dry fluid is a fluid that expands isentropically from saturated vapor into superheated vapor. For example, water is a wet fluid, as shown in FIG. 6, isopentane is a dry fluid, as shown in FIG. 7, and methanol is a wet fluid, as shown in FIGS. 3, 4, and 5. In conclusion, water is a wet fluid (but not a binary fluid), isopentane is a dry binary fluid, and methanol is a wet binary fluid.

Prior to both Carnot and Rankine, various types of reciprocating steam engines had been implemented successfully, as evidenced by U.S. Pat. No. 0,000,001 to Ruggles (1836) for an improvement to a steam locomotive. For a variety of reasons, these engines suffered from low efficiencies.

Gustaf de Laval invented the impulse steam turbine in 1882, and Charles Parsons invented the reaction steam turbine in 1884. These inventions rapidly replaced steam engines, and modern steam turbines descend from one or both of these two inventions. Nevertheless, they have limitations.

While water is a satisfactory motive fluid for most applications, the Rankine cycle suffers from increasing pressure losses and decreasing operating pressures that rapidly reduce power output as the resource temperature drops closer to the 100° C. boiling point of water. Therefore, primarily due to the thermophysical properties of water (especially its boiling point), the Rankine cycle is generally limited to turbine inlet steam temperatures of 150° C. or greater. In Geothermal Reservoir Engineering (2009), I present a conceptual system design of a complete geothermal power system that shows peak system power output at 150° C. turbine inlet temperature.

In response to this problem, a number of attempts have been made to identify a motive fluid better than water and a thermal power cycle better than Rankine.

U.S. Pat. No. 1,154,880 to Patten (1915) proposed a Rankine cycle with carbon dioxide as a potential binary motive fluid. Because of the low boiling point and critical temperature of carbon dioxide, such a system would have to operate in the supercritical region at very high pressures, stressing the system components and increasing their expense.

Shortly after CFCs (chlorofluorocarbons) were invented, U.S. Pat. No. 2,301,404 to Holmes (1942) proposed a Rankine cycle with four different CFCs as potential binary motive fluids. Since these are dry fluids with low boiling points, they would expand to superheated vapor, losing useful power and reducing efficiency. Such a system would probably require a regenerator (an additional, fifth component) and its added expense. Because of their low boiling points, the fluids would need to be condensed under pressure, putting back-pressure on the expander and further reducing its efficiency. Also, the system would probably need a compressor rather than a liquid pump, further increasing power losses and adding expense.

U.S. Pat. No. 2,471,476 to Benning et at (1949) proposed a Rankine cycle with octafluorocyclobutane (a hydrofluorocarbon or HFC) as a potential binary motive fluid. Since this is a dry fluid with a low boiling point, it would expand to superheated vapor. Such a system would require a regenerator (an additional, fifth component, as shown by Benning et al. in their FIG.), probably require a compressor rather than a liquid pump, and suffer from limited efficiency as for CFCs.

U.S. Pat. No. 3,040,528 to Tabor et al. (1962) proposed a Rankine cycle with octane or higher alkanes or heavier aromatics (hydrocarbons or HCs), heavier ethers, or chlorinated hydrocarbons as potential binary motive fluids. This is often referred to as the ORC (organic Rankine cycle). Since these are all dry fluids, they would expand to superheated vapor. Such a system would require a regenerator (an additional, fifth component, as shown by Tabor et al. in their FIG. 3), probably require a compressor rather than a liquid pump, and suffer from limited efficiency as for CFCs and HFCs.

U.S. Pat. No. 3,516,248 to McEwen (1970) proposed a group of potential binary motive fluids. After studying the thermophysical properties of a wide variety of pure substances, he recommended for use the dry fluids (as shown by McEwen in his FIG. 2). If used in an ORC system, these dry fluids would expand to superheated vapor, losing useful power and reducing efficiency. He also documented the efficiency advantage possessed by the wet steam motive fluid of the Rankine cycle over the six dry organic motive fluids recommended for the ORC (as shown by McEwen in his Table 11). This strengthens the argument for wet motive fluids being superior to dry motive fluids in Rankine cycle applications.

U.S. Pat. No. 3,722,211 to Conner et al. (1973) proposed a Rankine cycle with a mixture of trifluoroethanol and 3 to 25% water as a potential binary motive fluid. The pure substance trifluoroethanol is a dry fluid (as shown by Conner et al. in their FIG. 2). When mixed with water, the mixtures' properties can be modeled as slightly wet (as shown by Conner et al. in their FIGS. 3 and 4), but trifluoroethanol and water do not form an azeotrope. Therefore, the use of these mixtures in a Rankine cycle would likely result in fractional distillation, concentrating trifluoroethanol in the vapor in the evaporator, expander, and condenser, while concentrating water in the liquid in the condenser, pump, and evaporator. Thus, the actual motive fluid in the expander would be different from the initial motive fluid mixture. Furthermore, the fluid expands to superheated vapor (as described by Conner et al. in their Example 1), so the system would suffer from limited efficiency as for CFCs, HFCs, and HCs.

U.S. Pat. No. 3,841,009 to Somekh (1974) proposed a Rankine cycle with a potential binary motive fluid comprising a mixture of 10 to 75% water and one of a group of pyridines. Pure pyridine is a dry fluid that would expand to superheated vapor (as shown by Somekh in his FIG. 8). Non-azeotropic mixtures of water and pyridines will suffer from fractional distillation as for trifluoroethanol and water. Azeotropic mixtures of water and pyridines expanded to superheated vapor (as shown by Somekh in his FIGS. 10 and 11) will suffer from limited efficiency as for CFCs, HFCs, HCs, and trifluoroethanol. The proposed system also requires a hot well (an additional, fifth component, as shown by Somekh in his FIG. 12), which increases system cost.

U.S. Pat. No. 4,008,573 to Petrillo (1977) proposed a Rankine cycle with a potential binary motive fluid comprising three components: ethyl alcohol, water, and pyridine (or one of a number of other substances). A complex system was proposed that focused mainly on the avoidance of corrosion and freezing. Details of the thermodynamic states of the proposed power cycle were not provided. In addition, if the proposed mixtures were not azeotropic, the proposed system would suffer from the fractional distillation problem as for trifluoroethanol and water.

U.S. Pat. No. 4,233,525 to Enjo (1980) proposed a Rankine cycle with a potential binary motive fluid comprising an azeotropic mixture of tetrafluoropropanol and water. Azeotropic mixtures of tetrafluoropropanol and water expanded to superheated vapor (as shown by Enjo in his FIG. 2) would suffer from limited efficiency as for CFCs, HFCs, HCs, trifluoroethanol, and pyridines.

U.S. Pat. No. 4,346,561 to Kalina (1982) proposed an alternative to the Rankine cycle with a potential binary motive fluid comprising a mixture of ammonia and water and employing a desorption/absorption process. This is often referred to as the Kalina cycle. Such a system would require at least seven components (three more than Rankine), increasing its cost.

U.S. Pat. No. 4,557,112 to Smith (1985) proposed an alternative to the Rankine cycle with a motive fluid expanding from saturated liquid to two-phase vapor and liquid mixture, progressively drying, while delivering mechanical power. This is often referred to as the Trilateral cycle. It requires addition of a flashing chamber or use of a flashing expander (as shown by Smith in his FIGS. 14, 15, and 16). Because so much of the heat addition would take place in heating from cold, subcooled liquid to hot, subcooled liquid and so little of the heat addition would take place at the peak temperature of the evaporator exit, this system would suffer from limited efficiency.

U.S. patent application 20050188697 by Zyhowski et al. (2005) proposed a new family of potential binary motive fluids based on the fluorination of ethers and ketones, and it specified that they all be dry fluids (as described by Zyhowski et al. in their SUMMARY). A system using any one of these motive fluids would suffer from the same limitations on efficiency of other ORC systems.

U.S. patent application 20060245733 by Pierson et al. (2007) proposed a supercritical binary system. While methanol is proposed as one of many potential binary motive fluids (as described by Pierson et al. in their DETAILED DESCRIPTION), this supercritical system would fail to take advantage of methanol's wet property. In addition, the expander would exhaust superheated vapor (as described by Pierson et al. in their first example and in FIG. 1), losing useful power and reducing efficiency. This would be a complex system (having at least nine components, as described by Pierson et al. in their SUMMARY). Finally, since methanol has a critical temperature of 239° C. or 462° F., this first example is exclusively a supercritical system (as described by Pierson et al. in their CLAIM 8).

U.S. patent application 20110048014 by Chen (2011) proposed a combination power generation system comprising a steam Rankine cycle first stage and an ORC second stage. This application proposed methanol as a possible binary motive fluid for the ORC second stage of the system. Since the fluid leaving the second turbine and entering the cooling coil pipe is vapor (as described by Chen in his BRIEF DESCRIPTION), the second turbine must exhaust either saturated vapor or superheated vapor and not saturated vapor and liquid mixture. Furthermore, TABLE 1 shows relative performance of nine fluids in this system: n-butane is the best, and methanol is the second to the worst. This could be another example of the system failing to take advantage of the wet property of methanol, letting heat escape from the turbine unused as superheated vapor, and suffering limited efficiency.

In the relevant prior art in this field, there have been a small number of major advances and a larger number of smaller advances. For the avoidance of prolixity, I have only referenced the first relevant patent or published patent application for each major advance. Subsequent patents or published patent applications have tended to make small enhancements or add complexity, making them less relevant than their references for this application.

All of the binary power systems heretofore known suffer from a number of disadvantages:
 (a) expanding dry binary motive fluids, losing useful power and reducing efficiency,
 (b) expanding wet binary motive fluids to superheated vapor, which is less efficient than expanding to two-phase vapor and liquid mixture,
 (c) use of fluids with low boiling points, requiring them to be condensed under pressure, thereby putting back-pressure on the expander and further reducing its efficiency,
 (d) use of more than four system components, adding cost to the system,
 (e) probable need for a compressor rather than a liquid pump, further increasing power losses and adding expense,
 (f) overall lower system efficiency, and
 (g) overall higher system cost.

SUMMARY

In accordance with one embodiment, a thermal power cycle comprises a wet binary motive fluid, a pump, an evaporator, an expander, and a condenser.

ADVANTAGES

Thus, several advantages of one or more aspects are to provide a simpler thermal power cycle. Other advantages of one or more aspects are to provide a thermal power cycle that is capable of exploiting lower temperature heat sources and utilizing a wider range of heat sinks for cooling with higher efficiency and at lower cost. These and other advantages of one or more aspects will become apparent from a consideration of the ensuing description and accompanying drawings.

DRAWINGS

Figure 2:
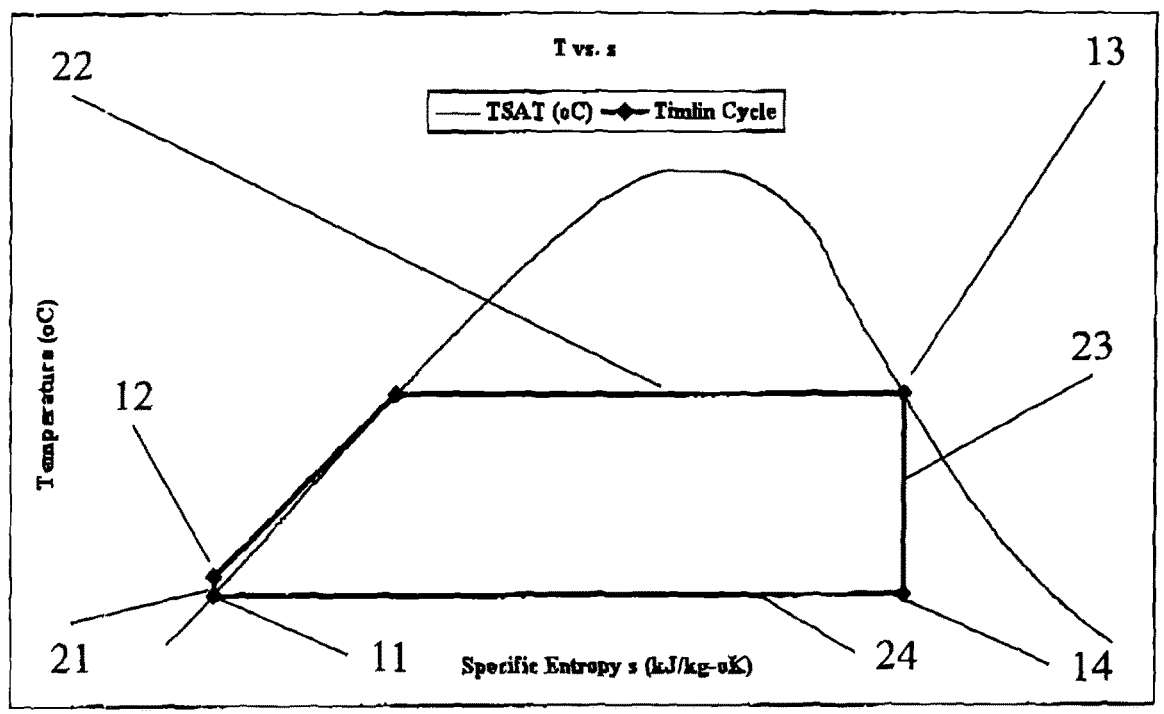
Figure 3A:
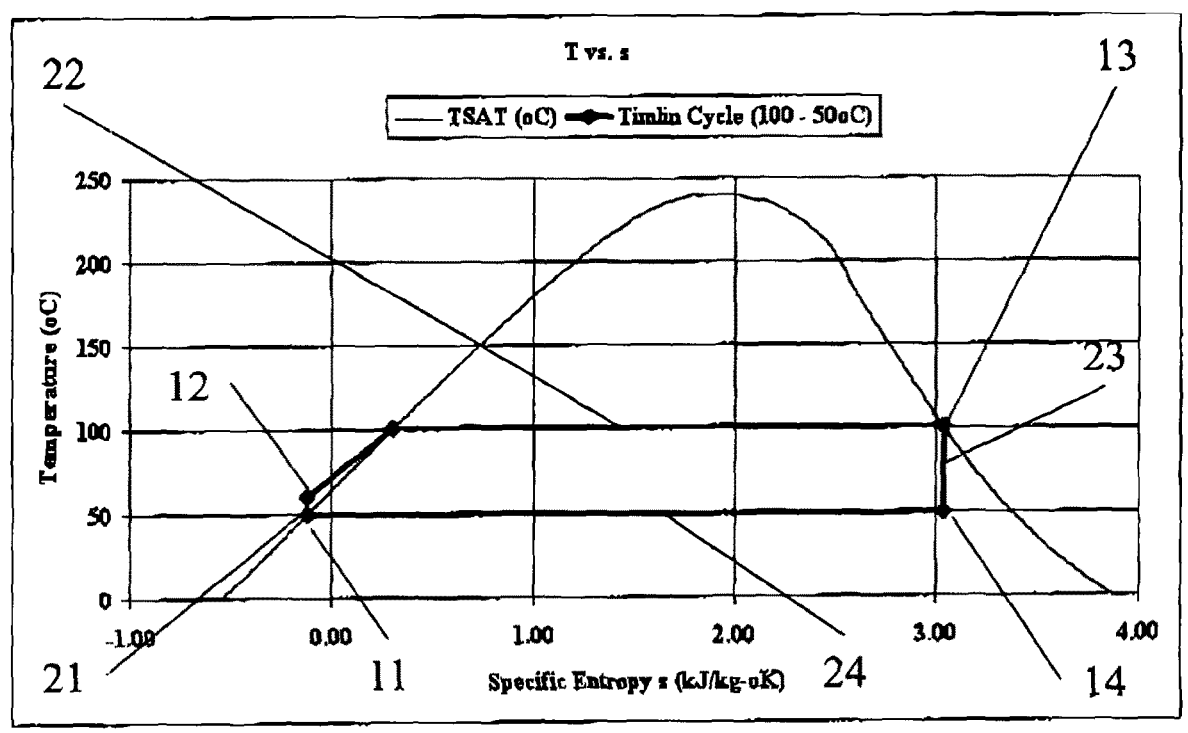
Figure 3B:
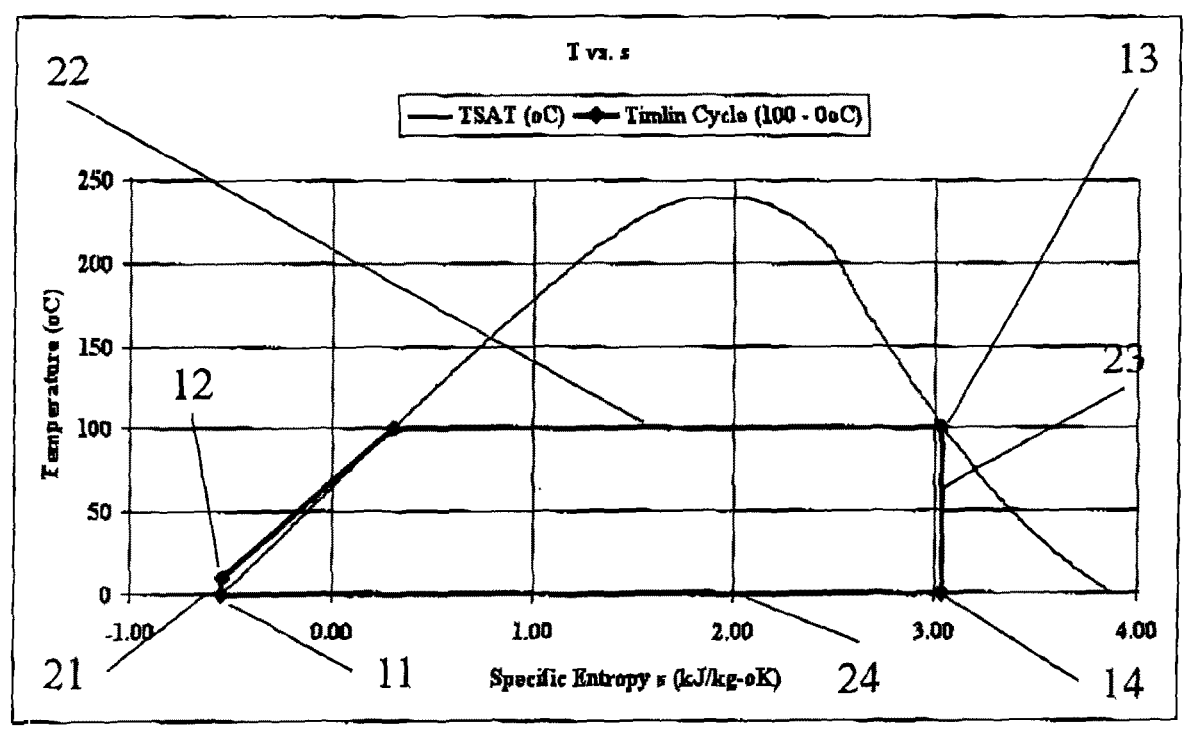
Figure 4A:
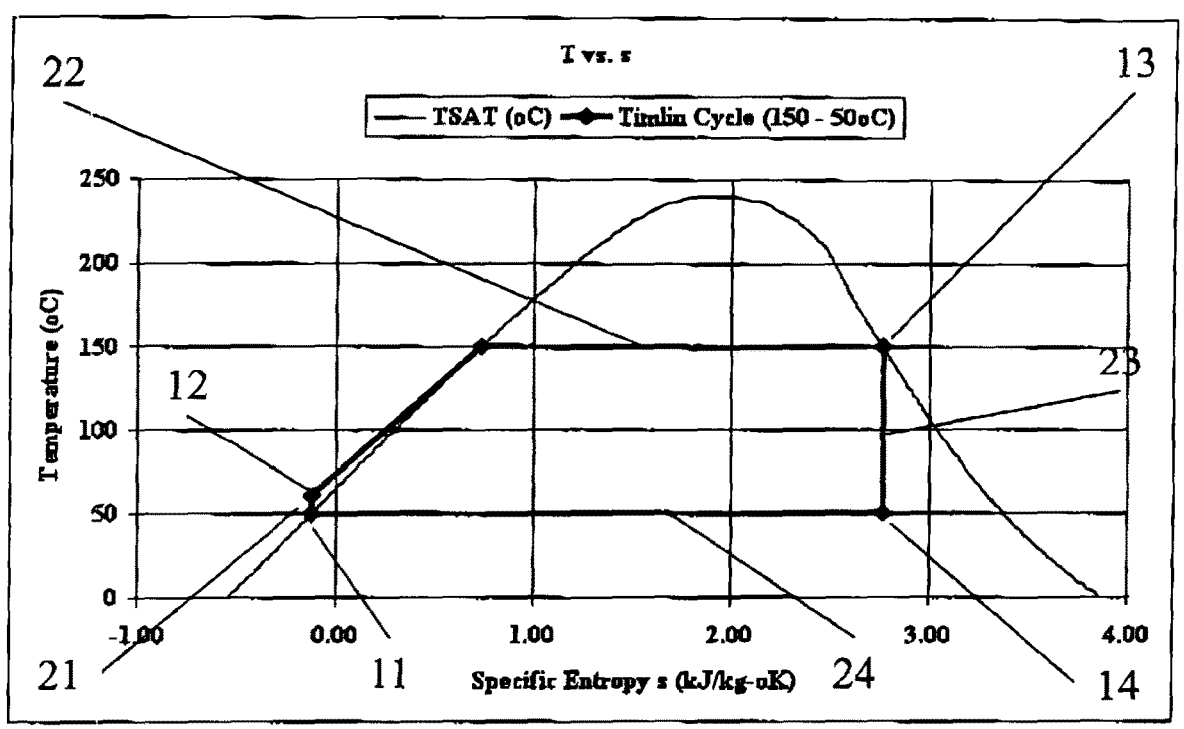
Figure 4B:
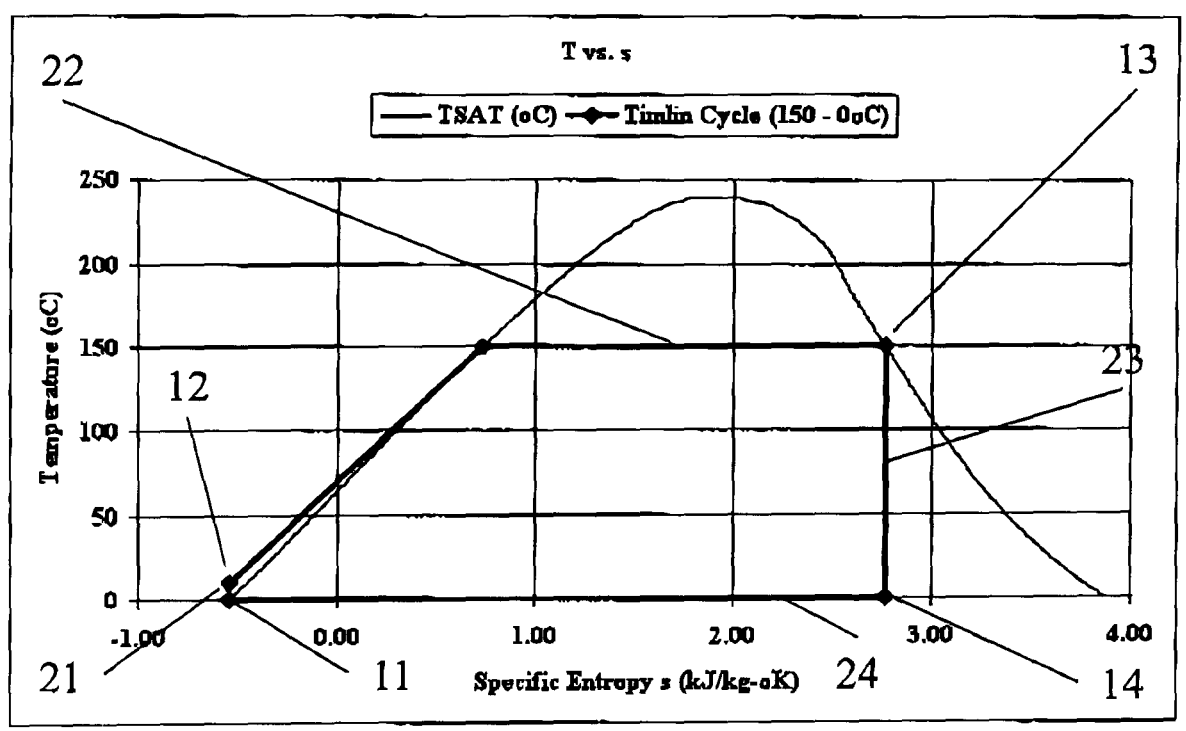
Figure 5A:
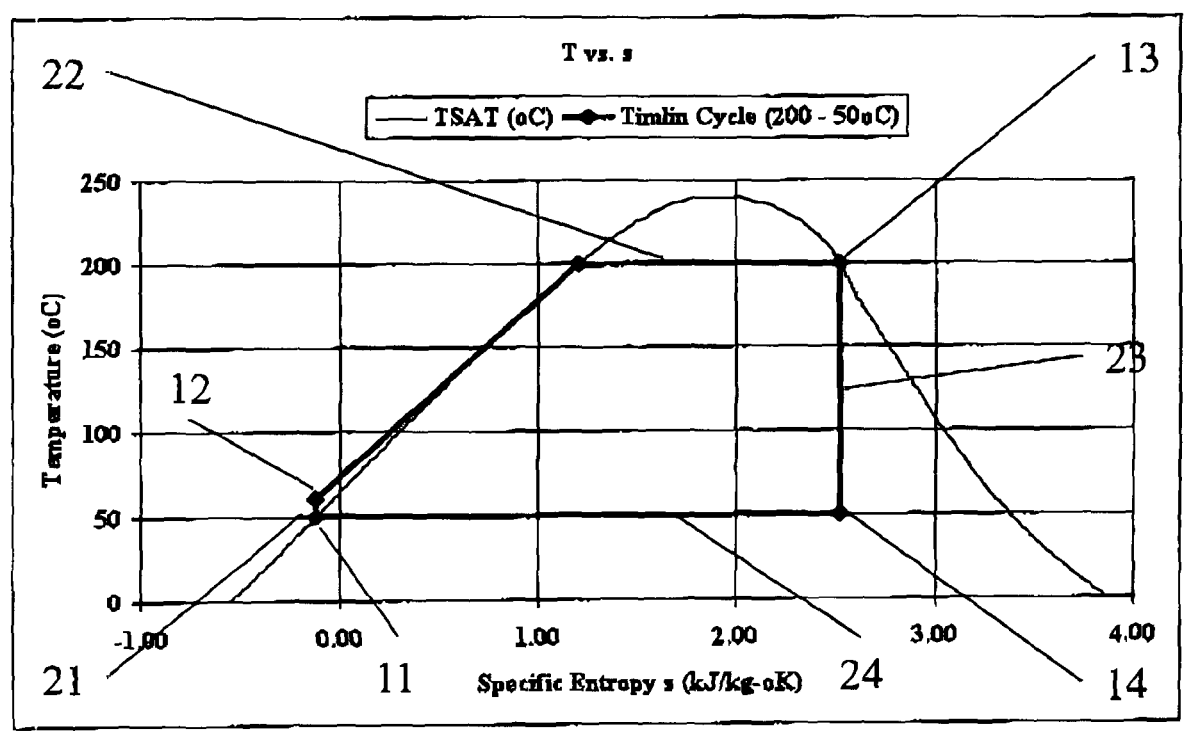
Figure 5B:
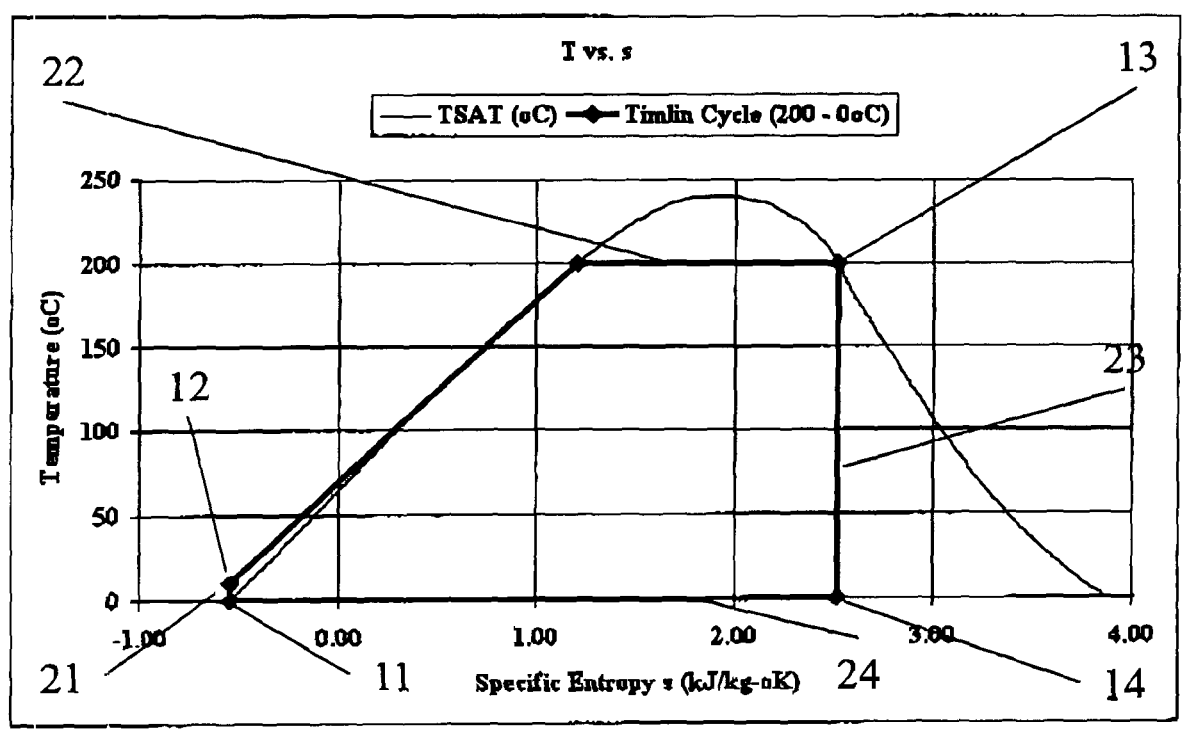
Figure 5C:
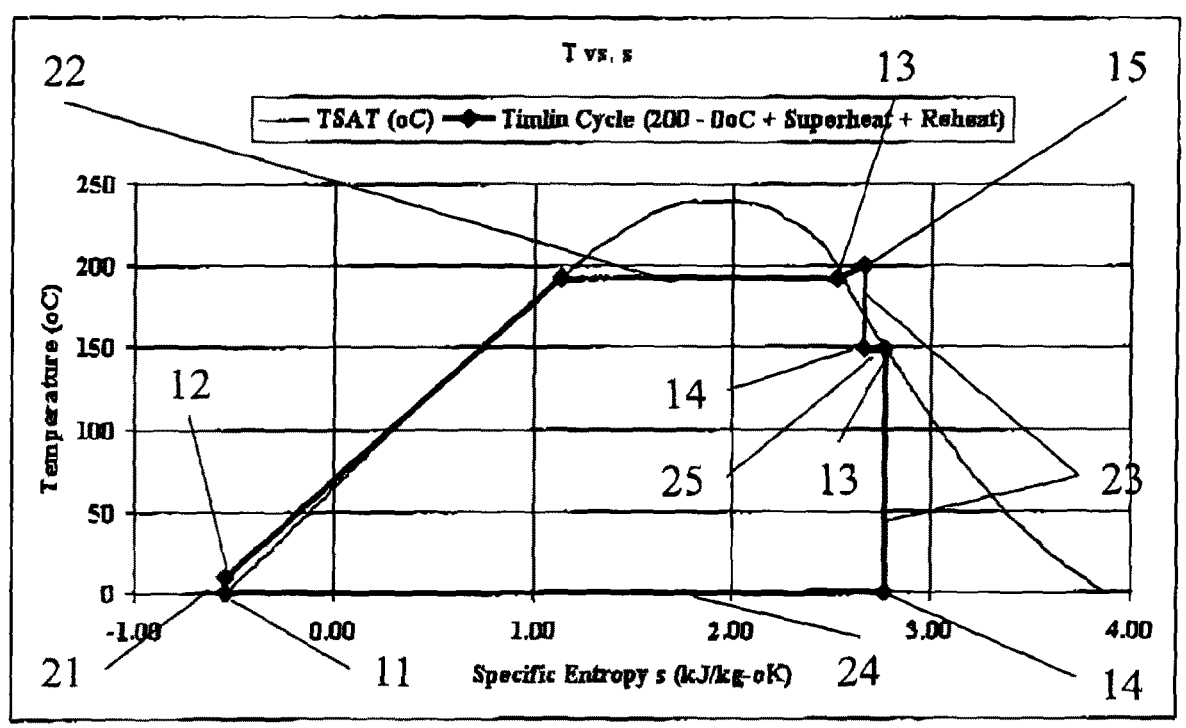

FIG. 1 is a schematic of a typical Timlin cycle.
FIG. 2 is a T vs. s diagram of a typical Timlin cycle.
FIG. 3A is a T vs. s diagram of a first embodiment.
FIG. 3B is a version of FIG. 3A with a lower condenser temperature.
FIG. 4A is a T vs. s diagram of a second embodiment.
FIG. 4B is a version of FIG. 4A with a lower condenser temperature.
FIG. 5A is a T vs. s diagram of a third embodiment.
FIG. 5B is a version of FIG. 5A with a lower condenser temperature.
FIG. 5C is a version of FIG. 5B with addition of superheat and reheat.
FIG. 6—PRIOR ART is a T vs. s diagram of a steam Rankine cycle.
FIG. 7—PRIOR ART is a T vs. s diagram of an isopentane organic Rankine cycle.

REFERENCE NUMERALS

11 Saturated liquid
12 Subcooled liquid
13 Saturated vapor
14 Two-phase vapor and liquid mixture
15 Superheated vapor
16 Supercritical fluid
21 Pump
22 Evaporator
23 Expander
24 Condenser
25 Reheat inlet
26 Direct-contact heat exchange inlet

DETAILED DESCRIPTION

FIGS. 1 and 2—First Embodiment

FIG. 1 is a schematic of a typical Timlin cycle. The states that comprise the cycle are:
1 Saturated liquid 11
2 Subcooled liquid 12
3 Saturated vapor 13
4 Two-phase vapor and liquid mixture 14
The Timlin cycle also includes the possibility of superheated vapor 15 in state 3.
The processes that comprise the cycle are:
1 Isentropic compression by pump 21 of saturated liquid 11 to subcooled liquid 12
2 Isobaric heating by evaporator 22 of subcooled liquid 12 to saturated vapor 13
3 Isentropic expansion by expander 23 of saturated vapor 13 to two-phase vapor and liquid mixture 14
4 Isobaric cooling by condenser 24 of two-phase vapor and liquid mixture 14 to saturated liquid 11

The Timlin cycle includes the possibility of process 2 being isobaric heating by evaporator 22 of subcooled liquid 12 to superheated vapor 15.

The Timlin cycle also includes the possibility of process 3 being isentropic expansion by expander 23 of superheated vapor 15 to two-phase vapor and liquid mixture 14.

The Timlin cycle further includes the possibility of process 3 being isentropic expansion by expander 23 of superheated vapor 15 to two-phase vapor and liquid mixture 14, reheating to a dryer condition, and then further isentropic expansion to a wetter and cooler condition at the exhaust of expander 23.

The system components that perform each of the above processes are shown and labeled on FIG. 1. The states of the wet binary motive fluid between the system components and their associated processes are also shown and labeled on FIG. 1. This cycle does not require the costly, inefficient regenerator and compressor that are usually required by ORC systems.

FIG. 2 is a T vs. s diagram of a typical Timlin cycle. As can also be seen from this diagram, the wet binary motive fluid expands isentropically from saturated vapor 13 at the hot source temperature all of the way to two-phase vapor and liquid mixture 14 at the cold sink temperature. This allows exploitation of the entire heat source—sink temperature difference. Since condensation begins in expander 23 and finishes in condenser 24 at low pressure, the wet binary motive fluid, its thermophysical properties, and the Timlin cycle eliminate the expensive, inefficient regenerator and compressor that are usually required by ORC systems.

For this embodiment, I contemplate the wet binary motive fluid being methanol, but other substances will work.

I contemplate pump 21 being a conventional radial-flow, centrifugal pump, as is commonly used in industry to pump liquids, but other types will work.

I contemplate evaporator 22 being a conventional indirect-contact, shell-and-tube heat exchanger, but other types will work.

I contemplate expander 23 being a conventional axial-flow, reaction turbine, with at least one reheat inlet 25 to receive saturated vapor 13 or superheated vapor 15 from evaporator 22, but other types will work. This is often referred to as a pass-in turbine.

I contemplate condenser 24 being based on a conventional shell-and-tube heat exchanger, but other types will work. It will be enhanced on the outside with at least one direct-contact heat exchange inlet 26 to receive subcooled liquid 12 from pump 21. It will be enhanced on the inside with at least one conventional spray, shower, jet or their equivalents for efficient direct-contact heat exchange between the two-phase vapor and liquid mixture 14 from expander 23 and the subcooled liquid 12 from pump 21. An external cooling sink will be available, such as cooling water passing through the tubes, and the shell will contain saturated liquid 11. The cooling water removes heal from condenser 24 by indirect-contact heat exchange then and rejects it to the external cooling sink. In any case, wet binary motive fluid never makes contact with cooling water.

I contemplate fabricating substantially all components, connectors, and pipes from austenitic steel, but other materials will work.

Operation

FIGS. 3A and 3B

In operation in a normal manner the Timlin cycle of embodiment shown in FIG. 3A operates as follows. Pump 21 receives wet binary motive fluid as saturated liquid 11 from condenser 24, compresses saturated liquid 11 to subcooled liquid 12, and delivers subcooled liquid 12 to evaporator 22. Using heat that is externally supplied at 100° C. from the heat source, evaporator 22 heats subcooled liquid 12 to saturated vapor 13, and delivers saturated vapor 13 to expander 23. Expander 23 receives saturated vapor 13, expands saturated vapor 13 isentropically to two-phase vapor and liquid mixture 14, drives an output shaft to deliver mechanical power, and delivers two-phase vapor and liquid mixture 14 to condenser 24.

Using coolant that is externally supplied at 50° C. from the heat sink, condenser 24 receives two-phase vapor and liquid mixture 14 from expander 23 and subcooled liquid 12 from pump 21, mixes them together, and produces a combined saturated liquid 11 condensate. Using coolant that is externally supplied at 50° C. from the heat sink, condenser 24 cools saturated liquid 11 by indirect-contact heat exchange and delivers saturated liquid 11 to pump 21, completing the cycle.

Expander 23 typically delivers mechanical power via an output shaft to turn a generator for electric power production or directly provides mechanical power to a local load. Pump 21 consumes a small amount of the power that is produced by expander 23. In addition to supplying subcooled liquid 12 to evaporator 22, pump 21 returns a portion of subcooled liquid 12 to condenser 24 to provide direct-contact heat exchange within condenser 24.

The embodiment shown in FIG. 3B operates in the same manner as the embodiment shown in FIG. 3A. In addition, the embodiment shown in FIG. 3B uses coolant that is externally supplied to condenser 24 at the lower temperature of 0° C. from the heat sink to produce significantly more power than the embodiment of FIG. 3A.

FIGS. 4A and 4B

Second Embodiment

The embodiment shown in FIG. 4A operates in the same manner as the embodiment shown in FIG. 3A. In addition, the embodiment shown in FIG. 4A uses heat that is externally supplied to evaporator 22 at the higher temperature of 150° C. from the heat source to produce significantly more power than the embodiment of FIG. 3A.

The embodiment shown in FIG. 4B operates in the same manner as the embodiment shown in FIG. 4A. In addition, the embodiment shown in FIG. 4B uses coolant that is externally supplied to condenser 24 at the lower temperature of 0° C. from the heat sink to produce significantly more power than the embodiment of FIG. 4A.

FIGS. 5A, 5B, and 5C

Third Embodiment

The embodiment shown in FIG. 5A operates in the same manner as the embodiment shown in FIG. 4A. In addition, the embodiment shown in FIG. 5A uses heat that is externally supplied to evaporator 22 at the higher temperature of 200° C. from the heat source to produce significantly more power than the embodiment of FIG. 4A.

The embodiment shown in FIG. 5B operates in the same manner as the embodiment shown in FIG. 5A. In addition, the embodiment shown in FIG. 5B uses coolant that is externally supplied to condenser 24 at the lower temperature of 0° C. from the heat sink to produce significantly more power than the embodiment of FIG. 5A.

The embodiment shown in FIG. 5C operates in the same manner as the embodiment shown in FIG. 5B. Also, it includes the addition of superheat by delivering superheated vapor 15 from evaporator 22 to expander 23. In addition, it includes the addition of reheat by delivering superheated vapor 15 to expander 23 at reheat inlet 25. The addition of superheat and reheat to this embodiment can be used to reduce and control the wetness of two-phase vapor and liquid mixture 14 within expander 23 and at its exhaust.

ADVANTAGES

From the description above, a number of advantages of some embodiments of my thermal power cycle become apparent:
(a) use of wet binary motive fluids allows for expansion from the heat source temperature to the heat sink temperature, maximizing power production and efficiency,
(b) elimination of the need for superheating the motive fluid maximizes the average temperature at which heat is transferred to the motive fluid, maximizing power production and efficiency,
(c) use of wet binary motive fluids with boiling points higher than the heat sink temperature, allowing the motive fluid to be condensed at or below standard atmospheric pressure, reducing back-pressure and further increasing power production and efficiency,
(d) use of fewer components results in a simpler, less costly system,
(e) use of an efficient liquid pump rather than the power-hungry compressor required by many ORC systems, further reducing power losses and expenses,
(f) overall higher system efficiency, and
(g) overall lower system cost.

CONCLUSIONS, RAMIFICATIONS, AND SCOPE

Accordingly the reader will see that, according to one embodiment of the invention, I have provided a simpler, more efficient, and less costly thermal power cycle that can address a wide range of heat source—sink temperatures.

While the above description contains many specificities, these should not be construed as limitations on the scope of any embodiment, but as exemplifications of various embodiments thereof. Many other ramifications and variations are possible within the teachings of the various embodiments. For example, the first embodiment can be adapted to exploit low-temperature and oil/gas co-produced geothermal resources. The second embodiment can be adapted to exploit separated produced water from flash geothermal power systems. The third embodiment can be adapted to exploit the entire energy flow of high-temperature geothermal systems. Alternative embodiments can exploit unused thermal power in waste heat recovery and other applications. In addition, motive fluids can be developed and selected for optimal performance in other heat source—sink temperature differences and ranges. These can include pure substances or mixtures or azeotropes of two or more pure substances, with water possibly being one of them.

Thus, the scope should be determined by the appended claims and their legal equivalents, and not by the examples given.

I claim:

1. A method for converting heat into mechanical power comprising:
   (a) compressing a motive fluid to form a subcooled liquid, the motive fluid being a non-aqueous wet fluid;
   (b) evaporating a first portion of the subcooled liquid with the heat at subcritical conditions to form a vapor;
   (c) expanding the vapor to produce mechanical power and a two-phase vapor and liquid mixture, the vapor being expanded approximately isentropically;
   (d) combining a second portion of the subcooled liquid with the two-phase vapor and liquid mixture to form a combined mixture;
   (e) condensing the combined mixture to form the motive fluid in step (a);
   repeating steps (a)-(e); and
   producing the mechanical power; wherein the motive fluid is an azeotrope.

2. The method of claim 1 wherein the boiling point of the motive fluid at standard atmospheric pressure is no more than 100° C.

3. The method of claim 1 wherein the motive fluid comprises methanol.

4. The method of claim 1 wherein the motive fluid includes a mixture of at least two substances.

5. The method of claim 1 wherein the first portion of the subcooled liquid is evaporated by a heat source having a temperature of no more than 200° C.

6. The method of claim 1
   wherein the two-phase vapor and liquid mixture in step (c) is a first two-phase vapor and liquid mixture and wherein step (c) further comprises:
      reheating the first two-phase vapor and liquid mixture to produce a reheated fluid; and
      expanding the reheated fluid to produce a second two-phase vapor and liquid mixture; and
   wherein the two-phase vapor and liquid mixture in step (d) is the second two-phase vapor and liquid mixture.

7. The method of claim 1 wherein the vapor formed by evaporating the subcooled liquid is superheated vapor.

8. The method of claim 1 comprising expanding the vapor in a reaction turbine.

9. The method of claim 8 wherein the reaction turbine is an axial-flow, reaction turbine.

10. The method of claim 1 wherein the subcooled liquid is evaporated in an evaporator, the vapor is expanded in an expander, and the combined mixture is condensed in a condenser.

11. A method for converting heat into mechanical power comprising:
    (a) compressing a motive fluid to form a subcooled liquid, the motive fluid being a non-aqueous wet fluid;
    (b) evaporating a first portion of the subcooled liquid with the heat at subcritical conditions to form a saturated motive fluid, the saturated motive fluid being substantially saturated vapor with no superheat;
    (c) expanding the saturated motive fluid to produce mechanical power and a two-phase vapor and liquid mixture, the saturated motive fluid being expanded approximately isentropically;
    (d) combining a second portion of the subcooled liquid with the two-phase vapor and liquid mixture to form a combined mixture;
    (e) condensing the combined mixture to form the motive fluid in step (a);
    repeating steps (a)-(e); and
    producing the mechanical power; wherein the motive fluid is an azeotrope.

12. The method of claim 11 wherein the boiling point of the motive fluid at standard atmospheric pressure is no more than 100° C.

13. The method of claim 11 wherein the motive fluid comprises methanol.

14. The method of claim 11 wherein the motive fluid includes a mixture of at least two substances.

15. The method of claim 11
    wherein the two-phase vapor and liquid mixture in step (c) is a first two-phase vapor and liquid mixture and wherein step (c) further comprises:
       reheating the first two-phase vapor and liquid mixture to produce a reheated fluid; and
       expanding the reheated fluid to produce a second two-phase vapor and liquid mixture; and
    wherein the two-phase vapor and liquid mixture in step (d) is the second two-phase vapor and liquid mixture.

16. The method of claim 11 comprising expanding the saturated motive fluid in a reaction turbine.

17. The method of claim 16 wherein the reaction turbine is an axial-flow, reaction turbine.

18. The method of claim 11 wherein the subcooled liquid is evaporated in an evaporator, the saturated motive fluid is expanded in an expander, and the combined mixture is condensed in a condenser.

19. The method of claim 18 wherein the motive fluid is compressed by a pump, and wherein the motive fluid moves from the condenser to the pump without passing through a fluid reservoir.

\* \* \* \* \*